United States Patent [19]

Gurley

[11] 4,380,220
[45] Apr. 19, 1983

[54] INTERNAL COMBUSTION ENGINE

[76] Inventor: James R. Gurley, Rte. 5, Box 42, Rutherfordton, N.C. 28139

[21] Appl. No.: 189,309

[22] Filed: Sep. 22, 1980

Related U.S. Application Data

[63] Continuation-in-part of Ser. No. 5,964, Jan. 24, 1979, Pat. No. 4,277,506.

[51] Int. Cl.³ ............................................. F02B 53/00
[52] U.S. Cl. ................................. 123/226; 418/61 R
[58] Field of Search ............... 123/226, 227, 228, 229, 123/231, 242, 221, 223; 418/61 R

[56] References Cited

U.S. PATENT DOCUMENTS

| | | | |
|---|---|---|---|
| 336,144 | 2/1886 | Nash | 418/61 R X |
| 1,969,651 | 8/1934 | Kretschmer | 418/61 R |
| 3,429,301 | 2/1969 | Sandidge | 123/227 |
| 3,812,828 | 5/1974 | Griffiths | 123/242 X |
| 3,977,369 | 8/1976 | Spark et al. | 123/242 |

FOREIGN PATENT DOCUMENTS

| | | | |
|---|---|---|---|
| 164947 | 12/1949 | Australia | 123/242 |
| 453386 | 11/1949 | Italy | 123/228 |
| 38-15501 | 8/1963 | Japan | |

Primary Examiner—Michael Koczo
Attorney, Agent, or Firm—Luke J. Wilburn, Jr.; Wellington M. Manning, Jr.

[57] ABSTRACT

A four cycle internal combustion engine comprising a housing defining an internal compartment having one or more peripheral lobes, an inner body mounted in the housing for non-rotational orbital movement and having one or more peripheral lobes corresponding in number to the number of compartment lobes, and with each inner body lobe disposed within a corresponding compartment lobe for movement therein during at least a portion of the orbital movement of the inner body. The inner body is provided with one or more recesses corresponding in number to the inner body lobes and a movable wall member is mounted for movement in each inner body recess to define with the housing and inner body a fluid intake and compression chamber of the engine. The housing and inner body define a variable volume power chamber and a variable volume exhaust chamber in each peripheral lobe of the housing, and passageway means are provided for intercommunicating the intake and compression chamber with intake means of the engine, and with respective power chambers of the engine to transfer compressed fluid to the power chambers during orbital movement of the inner body. Exhaust chambers of the engine respectively communicate with exhaust port means during portions of the orbital movement of the inner body. Several embodiments of the engine are disclosed in the application, and the construction of the engine provides more efficient transfer of fuel combustion power to an output shaft of the engine.

17 Claims, 16 Drawing Figures

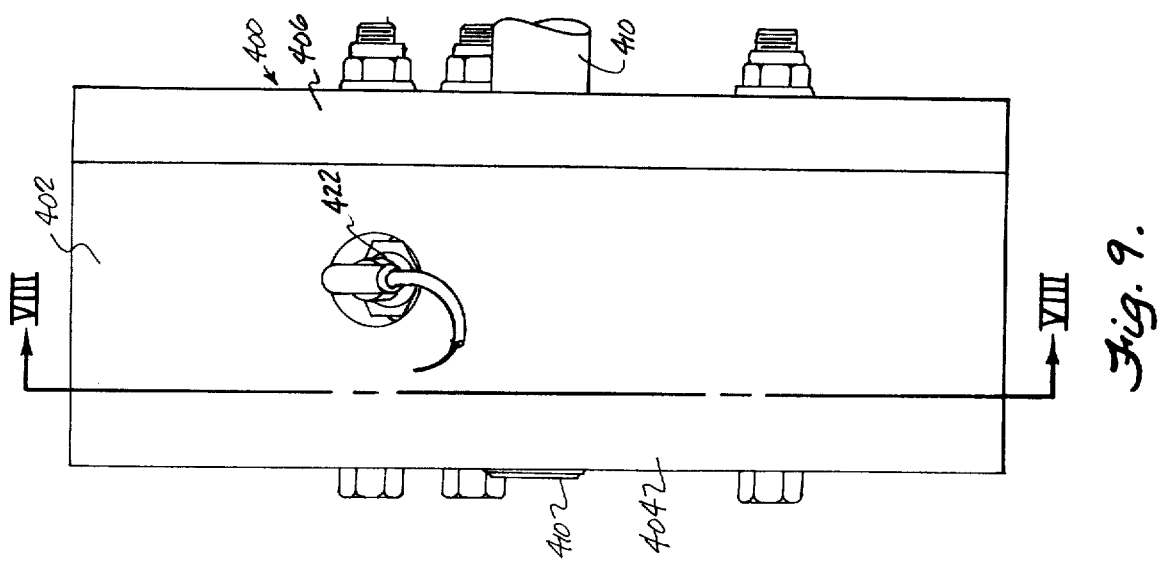
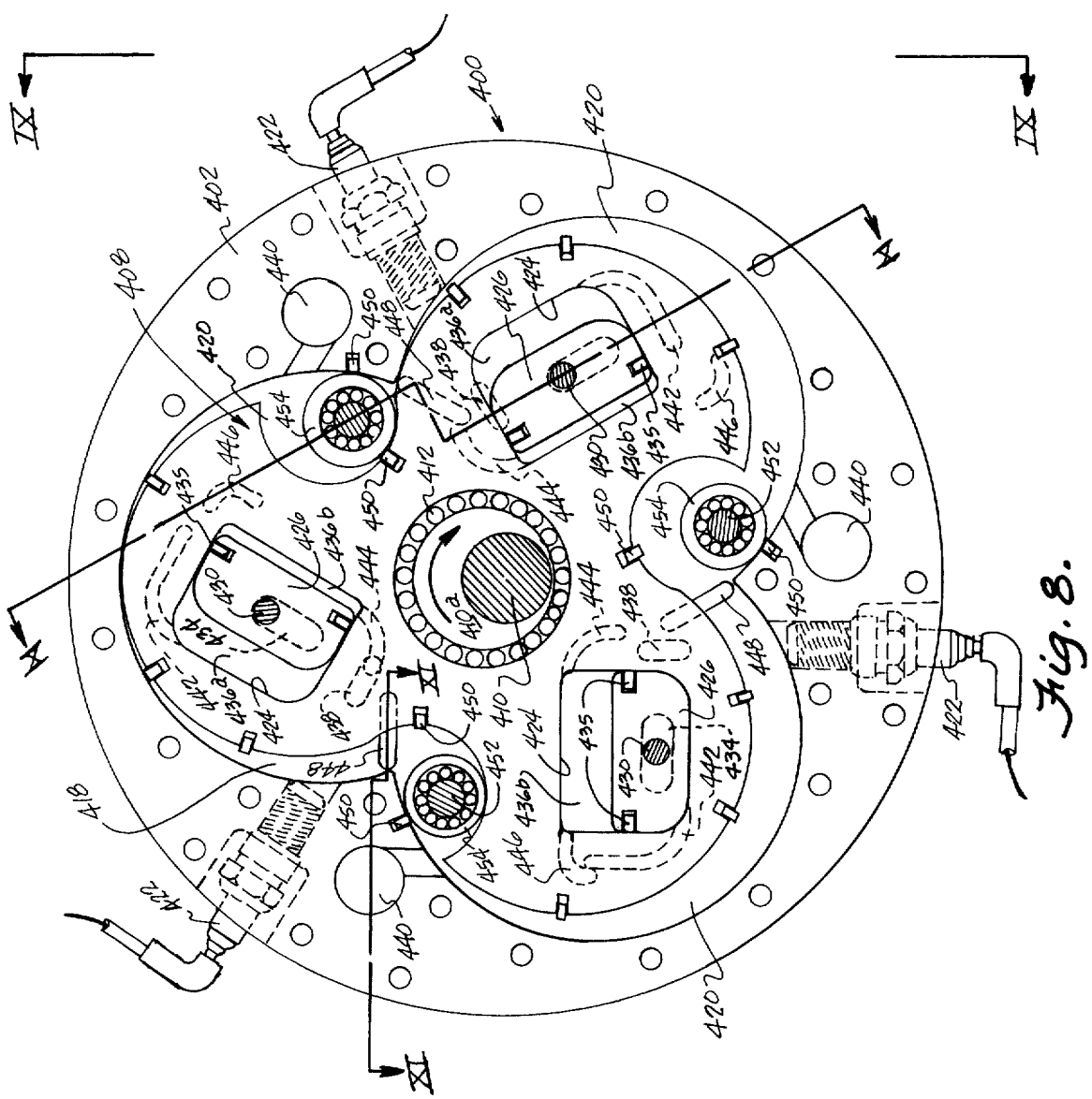
Fig. 9.
Fig. 8.

INTERNAL COMBUSTION ENGINE

This application is a continuation-in-part of my copending U.S. patent application Ser. No. 5,964, filed Jan. 24, 1979, now U.S. Pat. No. 4,277,506. The present invention relates to an internal combustion engine and, more particularly, to an improved four-cycle internal combustion engine of the eccentric piston type.

BACKGROUND OF THE INVENTION

Numerous designs of internal combustion engines have been proposed, developed and employed over the years. Since the early advent of the conventional reciprocating piston engine, technology has been directed to ways to reduce engine size, weight and cost in relation to power output, as well as to increase efficiency and reduce polluting emissions of the internal combustion engine. One approach in the effort to more efficiently convert combustion energy into rotational motion of a drive shaft has been the development of the rotary engine which in its basic arrangement, employs a rotor element having plural peripheral faces and apices mounted for eccentric rotation within a housing, with the apices sweepingly engaging the inner surfaces of the housing during rotor movement to divide the same into respective variable volume intake, compression, combustion and expansion chambers.

Certain work machines having rotary or orbital type piston elements mounted for movement in a housing unit are disclosed in the following patents which were developed or came to light in connection with the filling and examination of my above-mentioned copending application:

U.S. Pat. No. 336,144
U.S. Pat. No. 1,969,651
U.S. Pat. No. 2,117,662
U.S. Pat. No. 3,312,200
U.S. Pat. No. 3,545,413
U.S. Pat. No. 3,682,566
U.S. Pat. No. 3,707,073
U.S. Pat. No. 3,747,578
U.S. Pat. No. 3,812,828
U.S. Pat. No. 3,874,346
U.S. Pat. No. 3,921,595
Austrian Pat. No. 164,947
Italian Pat. No. 453,386

From a review of such patented literature, it appears that the various devices shown and described therein are of relatively complicated construction, and it is not known that any of such devices have found commercial acceptance as an internal combustion engine.

In regard to the internal combustion engines in present commercial use, the reciprocating piston engines of the prior art have the inherent disadvantage of poor efficiency due to the loss of power in translating reciprocating motion of the pistons into rotary motion of the crankshaft because of misdirection of power forces through connecting rods and crank arms at other than at optimum 90° angle to the direction of eccentricity of the crankshaft during its rotation. Although the rotary type engines provide advantage over the reciprocating piston engines in weight reduction and more efficient generation of rotary motion to the crankshaft, such rotary engines have had a continuous problem of wear of the apices of the rotor and housing wall due to their continuous sliding contact to seal and separate the fluid chambers of the engine.

It is therefore an object of the present invention to provide an internal combustion, four-cycle engine construction of the general type described in my aforesaid copending application which overcomes many of the disadvantages found in internal combustion engines of the prior art.

It is another object of the present invention to provide an engine construction having more efficient transfer of combustion power forces to crankshaft rotation during each revolution of the crankshaft, with reduction of frictional wear on the relative moving surfaces of the engine, thereby providing a more efficient engine operation.

It is a further object to provide a four-cycle, internal combustion engine of the type described in my aforesaid application comprising an engine housing defining an internal compartment having a non-rotatable inner body or piston element mounted for orbital movement in the compartment on an eccentric of the engine drive shaft, and defining with the housing and one or more movable wall members therein at least one group of chambers for fluid intake and compression, power or combustion, and exhaust of combustible fluids during orbital movement of the inner body.

It is a further object to provide a further embodiment of an internal combustion engine of the general type described in my pending application.

BRIEF DESCRIPTION OF THE INVENTION

Broadly, the subject matter of my copending application and the present application comprises a four-cycle internal combustion engine including a housing defining a compartment having at least one peripheral lobe; and an inner body, or piston member, having a corresponding number of peripheral lobes. The inner body is mounted for non-rotational, orbital movement within the compartment with each inner body lobe positioned for movement in its corresponding compartment lobe in response to combustion forces within the compartment to impart rotary motion to a power output shaft of the engine.

The compartment housing, inner body, and a movable wall member disposed within one or more openings or recesses in the inner body cooperatively define one or more groups (depending upon the number of lobes in the housing compartment) of variable-volume fluid intake and compression, power, and exhaust chambers, and certain of each group of chambers periodically inter-communicate during orbital movement of the inner body to carry out the four-cycle operation. The inner body is eccentrically mounted with respect to the rotational axis of a power output shaft to impart rotary motion thereto, and the peripheral wall portion of each inner body lobe which forms a portion of each power chamber is configured so as to impart combustion forces at a substantially right angle to the direction of eccentricity of the inner body during the full fuel combustion and expansion cycle, thus providing more efficient transfer of combustion forces in the power chamber into rotational movement of the output shaft.

While my aforesaid copending application describes and claims certain embodiments of the invention wherein the inner body recesses with their movable wall members form fluid intake and compression chambers on the periphery of the inner body between its peripheral lobes, the present application discloses further embodiments wherein the intake and compression chambers are located in inner body recesses or openings disposed radially inwardly of the inner body periphery to permit increased size of the peripheral combustion and exhaust chambers of the engine.

BRIEF DESCRIPTION OF THE DRAWINGS

The above, as well as other objects of the present invention will become more apparent, and the invention will be better understood, from the following detailed description of preferred embodiments of the invention, when taken together with the accompanying drawings, in which:

FIG. 8 is a schematic sectional elevation view, taken generally along line VIII—VIII of FIG. 9, of a further embodiment of the present invention, wherein the intake and compression chambers of the engine are located radially inwardly of the periphery of the inner body of the housing of the engine;

FIG. 9 is an elevation view of the engine of FIG. 8, looking in the direction of arrows IX—IX therein;

DETAILED DESCRIPTION OF PREFERRED EMBODIMENTS

Figure 1:
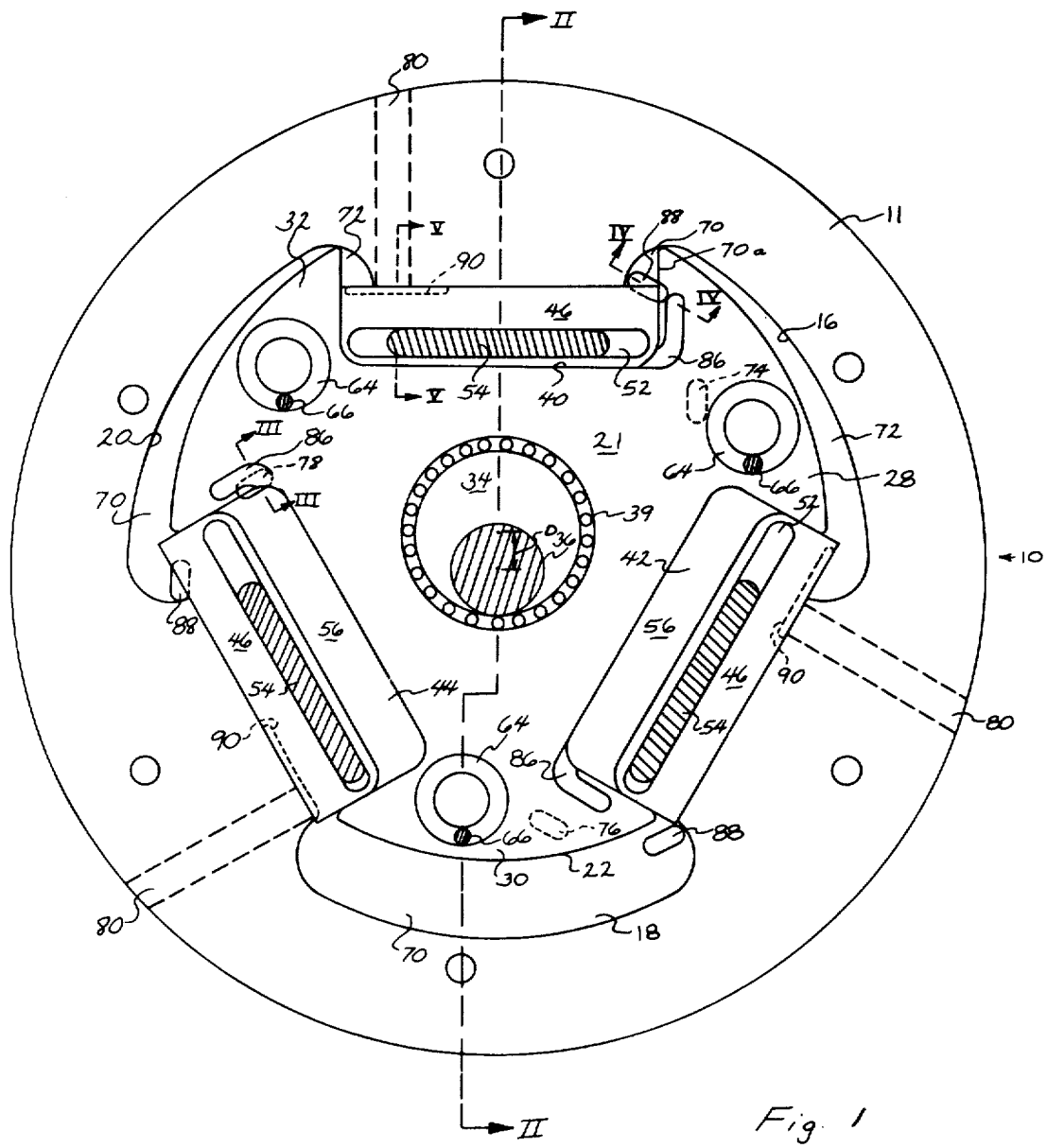
FIG. 1 is a schematic sectional end view of a multilobe, internal combustion engine of a first embodiment of the present invention, taken generally along line I—I of FIG. 2, and showing the disposition and arrangement of the inner body piston member and movable wall members therein.
Figure 2:
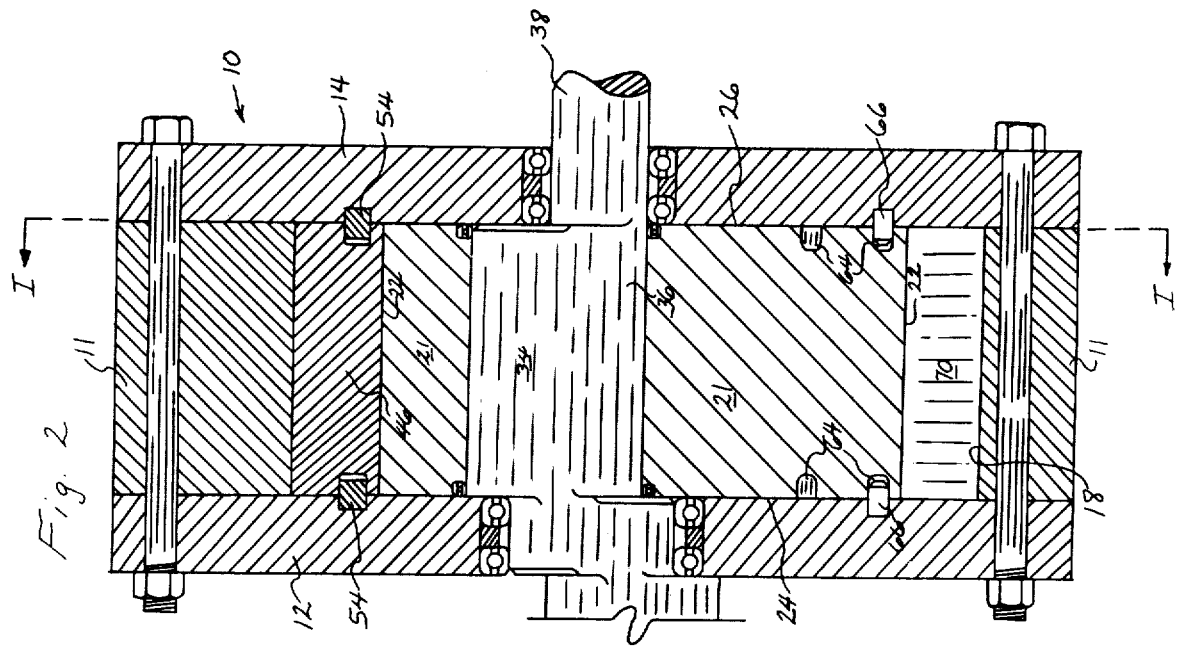
FIG. 2 is a sectional view of the internal combustion engine of FIG. 1, taken generally along line II—II thereof and looking in the direction of the arrows.

Referring more specifically to the drawings, FIGS. 1–5 illustrate one embodiment and form of the present invention wherein the internal combustion engine comprises three arcuately spaced groups of intake and compression, power, and exhaust chambers, each of which groups cooperate to impart rotary motion to a power output shaft through non-rotational, orbital movement of an inner body piston member eccentrically mounted thereon. As best shown in FIGS. 1 and 2, the engine comprises a generally cylindrical housing 10 having an outer peripheral wall 11 and generally parallel end walls 12, 14, spaced by peripheral wall 11 along the longitudinal axis thereof to define an internal compartment in the housing. The inner surface of peripheral wall 11 defines three outer lobes 16, 18, 20 of the compartment which are equally spaced about its periphery.

Located within the compartment is an inner body, or piston member, 21 having a peripheral wall surface 22 and spaced parallel end wall surfaces 24, 26 which sealingly engage respective adjacent end walls 12, 14 of the housing compartment. Inner body 21 also has a plurality of spaced peripheral lobes 28, 30, 32 corresponding in number to the compartment lobes, and the inner body is mounted for clockwise, non-rotational, orbital movement within the housing compartment on the eccentric portion 34 of a main crankshaft 36. Crankshaft 36 is supportably mounted by bearings in housing end walls 12, 14 for clockwise rotation about an axis parallel to and coincident with the longitudinal axis of the housing compartment, and an output shaft portion 38 (FIG. 2) of the crankshaft extends through an opening in the end wall 14 of the housing. As seen in FIG. 1, inner body 21 is disposed in the compartment so that each of its peripheral lobes 28, 30, 32 is positioned for movement into a corresponding one of the compartment lobes 16, 18, 20 during non-rotational, orbital movement of inner body 21.

Inner body 21 is mounted on the eccentric portion 34 of crankshaft 36 by roller bearings 39 so that the eccentric portion is free to rotate within the opening through the inner body 21 during rotation of the crankshaft. The central axis of eccentric portion 34 is displaced from the rotational axis of the output shaft by a distance, D, and the direction of eccentric displacement is hereinafter referred to as the crank angle.

Inner body 21 also is provided with peripheral recesses 40, 42, 44, each of which is located between an adjacent pair of inner body lobes and extends generally between adjacent pairs of compartment lobes. Disposed for movement within each inner body recess is a movable wall member 46, opposite surfaces of each of which has a central elongate groove 52. Each movable wall member 46 is mounted on housing end walls 12, 14 by spline elements 54 which are received in grooves 52 so that each member 46 moves radially inward and outward relative to its inner body recess in response to orbital movement of the inner body to define, with the inner body and housing, an inner variable-volume fluid intake and compression chamber 56 in each recess (two of which can be seen in an expanded condition in the position of the inner body shown in FIG. 1). The splines 54 and grooves 52 of each movable wall member also provide for alternating, endwise sliding movement of each wall member toward and away from the ends of its adjacent compartment lobes in response to orbital movement of the inner body, for a purpose to be explained. The movable wall members 46 mounted on housing 10 sealingly engage side walls of each inner body peripheral recess to prevent rotational movement of the inner body during its orbital movement within the housing compartment, as well as form the intake and exhaust chamber in each recess.

To further ensure non-rotational movement of the inner body during its orbital movement in the housing compartment, anti-rotation means may be provided in end walls 24, 26 of the inner body 21 and the adjacent housing end walls 12, 14. As seen in FIGS. 1 and 2, the anti-rotation means comprise three spaced, circular grooves 64 in each end wall 24, 26 of the inner body. Received in each groove 64 for movement therealong is a pin 66 which is attached to and extends from respective adjacent housing end walls 12,14. During orbital movement of the inner body 21 in the housing compartment, the housing end wall pins 66 move in their respective inner body grooves 64 to prevent any rotational movement of the inner body in the compartment, thus further engaging positive sealing engagement of peripheral wall portions of each inner body lobe with peripheral wall portions of its corresponding compartment lobe, as will be explained.

As best seen in FIG. 1, the peripheral wall of each inner body lobe cooperates with the peripheral and end walls of the housing, and with wall portions of each movable wall member to form an outer, variable-volume chamber in each compartment lobe 16, 18, 20. Each outer chamber is periodically subdivided into a power chamber 70 and an exhaust chamber 72 during a portion of the orbital movement of the inner body in the following manner. During clockwise, orbital movement of inner body 21 about the rotational axis of crankshaft 36, every point on inner body 21 describes a circular path having a radius equal to the distance, D, (FIG. 1) between the rotational axis of shaft 36 and the central axis of eccentric portion 34 on which the inner body is mounted. It can thus be appreciated that during every complete orbit of the inner body and 360° of rotation of the output shaft, each inner body lobe moves in a circular path, having a radius of D, into and out of its corresponding compartment lobe. During this movement into the compartment lobe, successive points along the periphery of each inner body lobe in the direction of orbital movement of the inner body progressively engage successive points along the peripheral wall of its compartment lobe to form a positive seal, subdividing the compartment lobe outer chamber into power chamber 70 and exhaust chamber 72. Each of the power and exhaust chambers so formed continuously vary in volume during orbital movement of the inner body. In the position of the inner body shown in FIG. 1, it can be seen that outer compartment lobes 16 and 20 are each momentarily subdivided into a power chamber 70 and an exhaust chamber 72, while outer compartment lobe 18 is momentarily a fully expanded power chamber 70, as will be explained.

Housing 10 is provided with intake port means comprising three pairs of fluid intake ports 74, 76, 78, with each pair being located in opposed, aligned relation in end walls 12, 14 of the housing. Each pair of intake ports communicate with the housing compartment at a position adjacent a respective compartment lobe and one end of a peripheral recess in the inner body. The housing compartment is further provided with exhaust port means comprising three fluid exhaust ports 80 (FIGS. 1 and 5) in the peripheral wall of the housing, one being located between each adjacent pair of compartment lobes.

Figure 3:
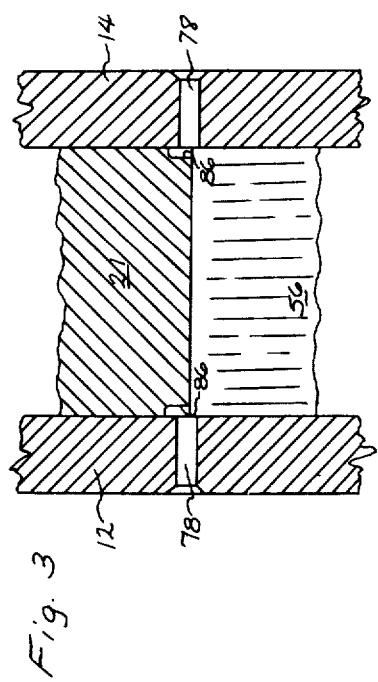
FIG. 3 is an enlarged partial sectional view of the engine of FIG. 1 taken generally along line III—III thereof and looking in the direction of the arrows.
Figure 4:
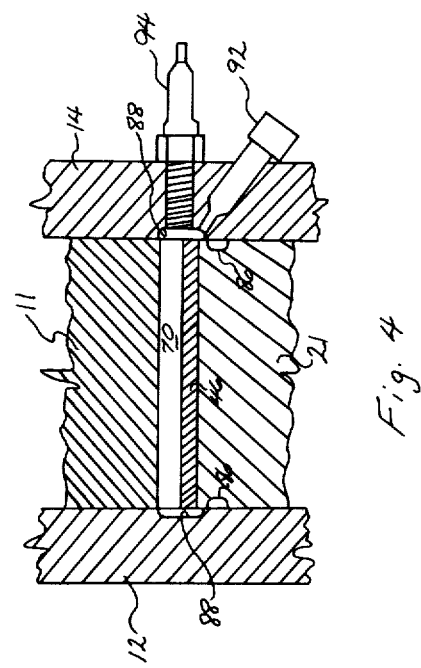
FIG. 4 is an enlarged partial sectional view of the engine of FIG. 1 taken generally along line IV—IV thereof and looking in the direction of the arrows.

Passageway means are provided for communicating each fluid intake and compression chamber 56 with a pair of intake ports during a portion of orbital movement of the inner body, and thereafter with the next adjacent power chamber thereto in the direction of orbital movement of the inner body. As seen in FIGS. 1, 3 and 4, extending from the right end of each inner body recess 40, 42, 44 in the surface of each inner body end wall 24, 26 is a generally elongate groove 86, each pair of which communicate with the respective inner body recess and the intake and compression chamber formed therein.

As seen in FIGS. 1 and 4, the inner surface of each housing end wall 12, 14 is also provided with a groove 88 adjacent and extending into the left hand end of each compartment lobe 16, 18, 20, each opposed pair of which are periodically engaged by an adjacent pair of elongate grooves 86 in the inner body to provide communication between the compression chamber in each inner body recess with its next adjacent power chamber 70 in the direction of orbital movement of the inner body. Thus during orbit of the inner body in the housing compartment, each pair of elongate grooves 86 communicating with an inner body recess move in a clockwise circular path to first overlie an adjacent pair of inlet ports to intake fluid as the inner body recess chamber is expanding (note chamber 56 in recess 44 of FIG. 1). Thereafter, each pair of grooves 86 move in its circular path to overlie a respective pair of housing end wall grooves 88 in the adjacent compartment lobe power chamber 70 to pass compressed fluid into the power chamber as the movable wall member 46 moves inwardly in the recess to compress the fluid in the chamber formed therein.

Figure 5:
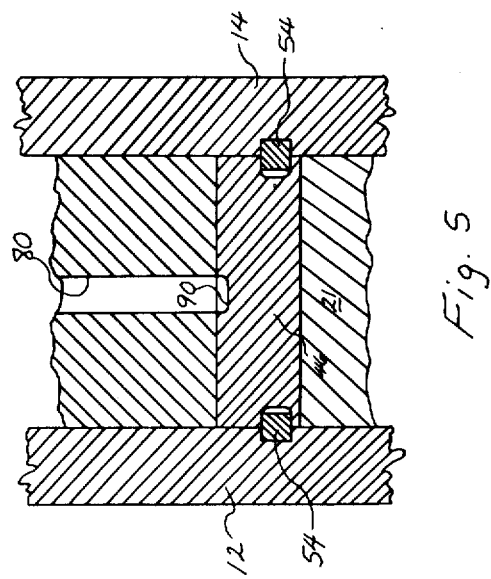
FIG. 5 is an enlarged partial sectional view of the engine of FIG. 1 taken generally along line V—V thereof and looking in the direction of the arrows.

As best seen in FIGS. 1 and 5, the outer face of each movable wall member 46 is provided with an elongate groove 90 located adjacent the right hand end of each compartment lobe 16, 18, 20. Upon complete expansion of each power chamber in each compartment lobe (as indicated by chamber 70 in compartment lobe 18, FIG. 1), and in response to continued orbital movement of the inner body, each movable wall member 46 will slide endwise on spline element 54 so that its groove 90 overlies the compartment lobe to form and communicate an exhaust chamber 72 in the lobe with the exhaust port 80 located adjacent thereto. (Note exhaust chambers 72 in compartment lobes 16 and 20). In this manner, expanded gases of combustion are discharged from the exhaust chamber 72 and from the engine housing.

Fuel for combustion in each of the three power chambers of the engine may be supplied by conventional gas carburetion with the intake air supplied to each of the intake chambers through intake ports 74, 76, 78. Alternatively, fuel may be injected directly into the compressed air in the power chamber at the beginning of the power cycle. As illustrated in FIG. 4, communicating with the left end portion of each of the compartment lobes 16, 18, 20 through a side wall of the compartment housing is a fuel injection port 92 for introducing fuel into the power chamber formed in each compartment lobe.

Also communicating with the left end of each compartment lobe and power chamber are suitable means for igniting the fuel in the power chamber in each lobe. If the engine of the present invention is to be employed as a gasoline combustion engine, a spark plug 94 may be provided to communicate with the power chamber, as shown in FIG. 4. If the engine of the present invention is to be employed as a diesel engine, suitable means, such as a glow plug may be provided for initial combustion of the diesel fuel injected into the power compartment. Conventional timing means, not shown, may be employed to sequence fuel injection and spark ignition in each power chamber 70.

The present invention may be better understood by a brief explanation of the operation of the three lobe embodiment of internal combustion engine shown in FIGS. 1-5. Referring to FIG. 1, it can be seen that the housing compartment lobes 16, 18 and 20 are equally arcuately spaced about the central axis of the housing compartment at 120° intervals, and the inner body lobes 28, 30, 32 are similarly spaced at 120° intervals about the central axis of the inner body. During clockwise rotation of the crankshaft, inner body 21 moves in a clockwise orbital path, with every point on the inner body describing a circular path having a radius equal to the distance of eccentricity, D, of the inner body axis from the axis of rotation of the crankshaft. Thus, during each 360° rotation of the crankshaft and full orbit of the inner body, each lobe of the inner body moves in a circular path into and out of its corresponding compartment lobe, with consecutive wall portions along the periphery of the inner body lobe sequentially engaging consecutive peripheral wall portions of the compartment lobe to divide the same into a power chamber and an exhaust chamber.

At the same time, the movable wall element 46 in each inner body recess moves inwardly and outwardly thereof once during each 360° revolution of the crankshaft to fully expand and collapse the intake and compression chamber 56 formed therein. During expansion, chamber 56 communicates with the inlet ports. Thereafter, chamber 56 communicates with the next adjacent power chamber 70 to pass compressed fluid thereinto during the latter portion of the compression stroke, i.e., as the movable wall member 46 moves radially inward in the inner body recess.

In the position of inner body 21 shown in FIG. 1, it can be seen that the intake and compression chamber in recess 40 is fully collapsed after the compression cycle, compressed fluid therefrom has been passed into the adjacent power chamber 70 in compartment lobe 16, and grooves 86 have just passed out of communication with grooves 88 so that power chamber 70 containing compressed fluid is sealed for initiation or combustion. Immediately upon combustion, it can be seen that the combustion force in power chamber 70 acts on a peripheral wall surface 70a of inner body lobe 28 which is substantially parallel to the crank angle of the crankshaft. Thus, the combustion and expansion force is applied to the inner body 21 and crankshaft 36 at a right angle to the crank angle to provide optimum transfer of force to impart rotation to the output shaft of the engine.

As the inner body lobe 28 moves further clockwise in compartment lobe 16, the power chamber 70 will progressively expand during combustion to a position as is illustrated by power chamber 70 in compartment lobe 20. In this position of the power cycle, it can be seen that the peripheral wall surface of the inner body lobe on which the force of combustion is applied still lies substantially parallel to the crank angle of the crankshaft, thus continuing a right angle application of force thereto throughout the major portion of the power cycle of each power chamber.

Fuel combustion in each power chamber in each compartment lobe of the engine causes the power chamber to expand to its maximum dimensions through 240° of rotation of the crankshaft. The position of the inner body lobe with respect to the housing lobe when the power chamber is fully expanded is illustrated by the compartment lobe 18 and the adjacent inner body lobe 30. Continued clockwise movement of the inner body lobe from fully expanded power cycle position causes movable wall member 46 to slide sideways over the end portion of the compartment lobe to communicate the chamber therein with exhaust port 80 by way of groove 90, thus forming an exhaust chamber 72 which progressively collapses to expel fluid from the housing. Although not shown, it is to be understood that suitable passages may be provided in the housing and inner body for circulation of a fluid cooling medium for the engine.

Figure 6:
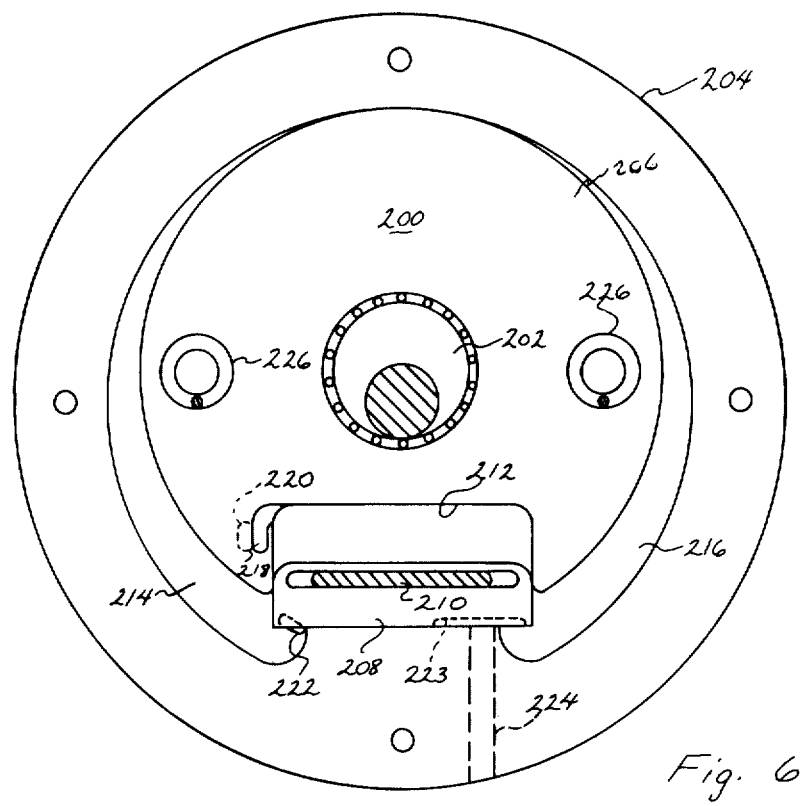
FIG. 6 is a schematic sectional end view of a single housing compartment lobe embodiment of the internal combustion engine of the present invention showing the disposition of the inner body and movable wall member in the housing compartment.

Although the invention shown in FIGS. 1-5 illustrates a three-lobe engine with three power cycles being initiated during each crankshaft revolution, it is to be understood that the engine of the present invention may comprise any number of compartment and inner body lobes with corresponding power cycles per crankshaft revolution, depending upon the size, weight, and power requirements of the engine. FIG. 6 illustrates schematically a one lobe engine embodiment of the invention wherein a single lobe inner body 200 is eccentrically disposed for non-rotational, orbital movement on a crankshaft 202 in a housing 304 having a single peripheral compartment lobe. Disposed between opposite ends of the inner body lobe 206 and the housing lobe is a movable wall member 208 which is mounted on the housing by spline element 210 for radial movement into and out of inner body peripheral recess 212 and for alternating endwise movement to overlie end portions of the housing compartment lobe in response to orbital movement of the inner body, in the same manner as a movable wall member of FIGS. 1-5. Thus during orbital movement of inner body 200, peripheral wall portions of the inner body sequentially engage peripheral wall portions of the housing compartment to form a variable volume power chamber 214 and exhaust chamber 216 therein. Also, during inner body movement, the variable volume intake and compression chamber formed in inner body recess 212 alternately communicates by way of passageway grooves 218 with intake ports 220 (only one of each shown), and then with power chamber 215 through grooves 222 (only one shown) to intake fluid and to pass compressed fluid to the power chamber, as in the three-lobe embodiment of FIGS. 1-5.

As can be seen, the movable wall member 208 is provided with an outer wall groove 223 to permit communication of exhaust chamber 216 with exhaust port 224 in the housing wall to discharge expanded gases of combustion therefrom during the four-cycle operation of the engine. In the one lobe embodiment of FIG. 6, it can be seen that combustion and expansion of the gases in power chamber 214 occurs through approximately 360° of crankshaft rotation. Anti-rotation devices 226 of the type shown in the embodiment of FIGS. 1-5 may be utilized to ensure non-rotational movement of the inner body during its orbital movement in housing 204. Although not shown, fuel injection means and suitable spark initiation means may be employed in the end portion of power chamber 214 to introduce fuel into the chamber and ignite same during the combustion and power stroke of the engine.

Figure 7:
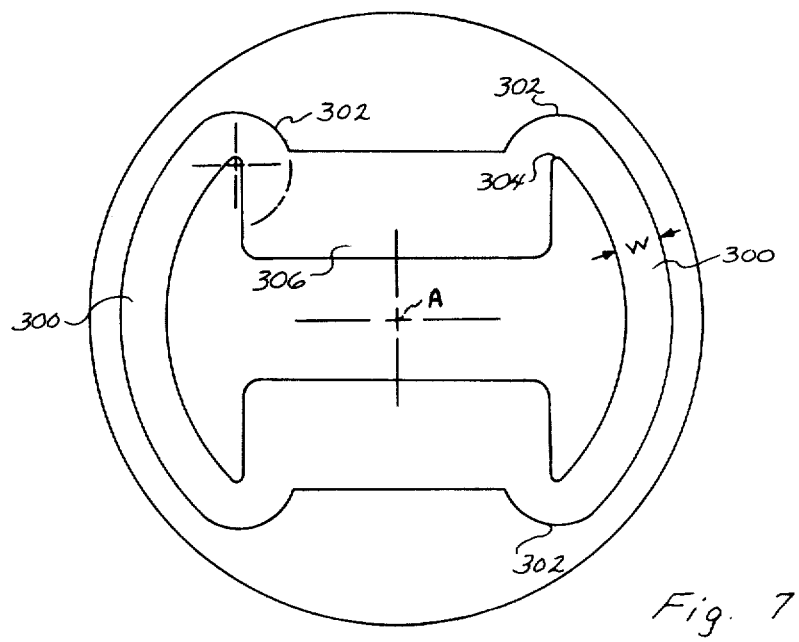
FIG. 7 is a schematic representation of the manner in which component parts of the engine of FIGS. 1–6 may be machined from metal stock material.

As can be appreciated, the curvature of the peripheral wall of each inner body lobe and its corresponding compartment lobe are so shaped as to ensure sealing engagement of the peripheral inner body lobe wall with the peripheral compartment lobe wall during orbital movement of the inner body. In practice, this may be accomplished by machining an inner body and peripheral housing wall from a single metal cylinder, or block of material. As illustrated by a two lobe engine embodiment in FIG. 7, the peripheral wall of a compartment housing and an inner body may be formed simultaneously by cutting a sinuous pathway 300 about a common axis A through the stock material, the width W of the pathway 300 being equal to the desired distance of eccentricity at which the inner body is to be mounted on a crankshaft from its axis of rotation. The radius of curvature of the end portions 302 of the compartment lobes are correspondingly cut about a radius equal to the distance of eccentricity plus the radius of curvature of the tip portion 304 of the inner body lobes. In this manner, sealing engagement of the inner body lobes with the compartment peripheral wall is ensured during orbital movement of the inner body in the housing. The depth of each inner body peripheral recess 306 must be twice the distance of eccentricity, or slightly greater.

Although the embodiments of the engine in FIGS. 1-7 have been shown and described as having a single housing compartment with inner body therein, it can be appreciated that the engine may be composed of multiple compartments with inner bodies positioned along the length of a crankshaft in similar fashion as the pistons of a conventional reciprocating piston engine. If the engine is to be composed of a plurality of compartments and inner bodies eccentrically mounted on the crankshaft, it will be understood that the intake and exhaust port means of each compartment would be suitably channeled to the exterior of the housing through the end walls to the peripheral wall thereof.

Although the embodiments of the invention shown in FIGS. 1-7 of the drawings and specification employ plural pairs of passageways and intake ports for introducing fluid into each intake chamber and passing fluid from the intake chamber to the power chamber after partial compression, only one intake port and set of cooperating passageways may be utilized, if desired. The exact construction and arrangement of the passageways may be varied depending upon the number of inner body piston means and housing compartments utilized on a single crankshaft for the engine power output required.

Figure 11:
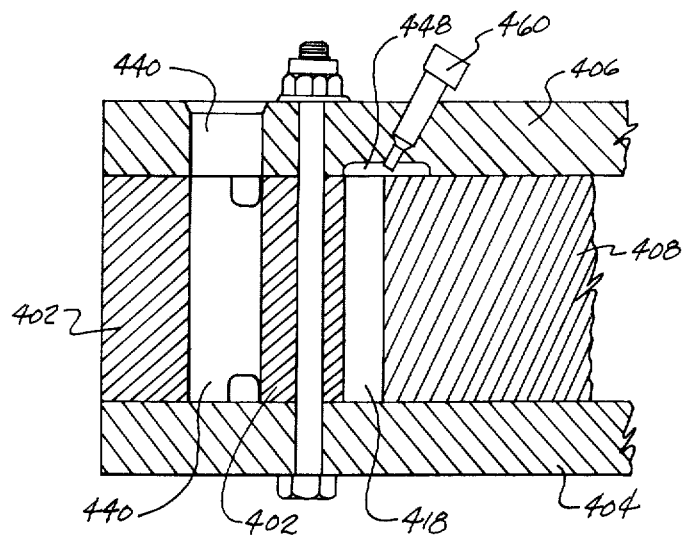
FIG. 11 is a sectional view of the engine of FIG. 8, taken generally along line XI—XI thereof, looking in the direction of the arrows, and further showing the location of a fuel injection port when the engine may be provided with the same.
Figure 12A:
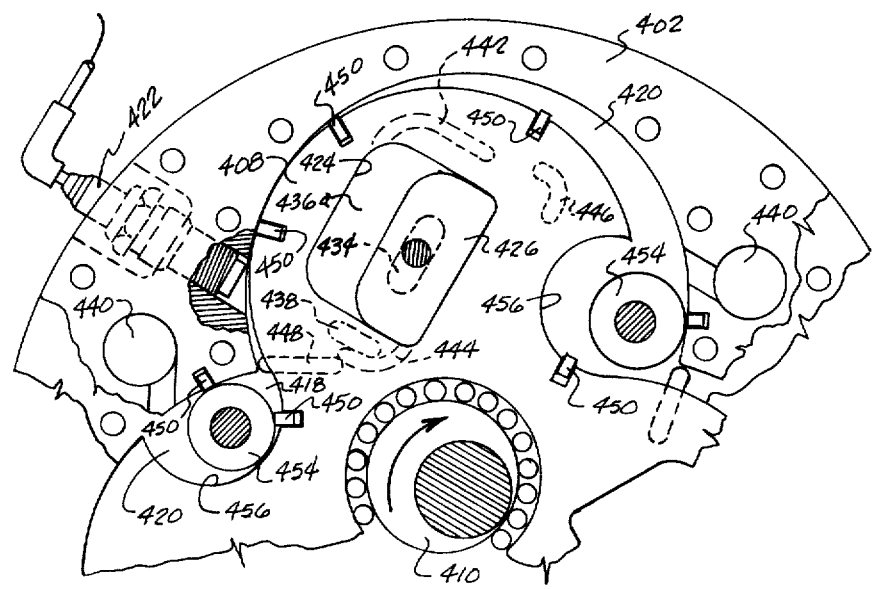
FIGS. 12a through 12d are broken away, sectional views of one lobe portion of the three-lobe engine embodiment as shown in FIG. 8, illustrating the position of the inner body lobe, its movable wall member, and the fluid transfer passageways at different angles of eccentricity of the inner body about the axis of rotation of the engine output shaft through 360° of shaft rotation.
Figure 12B:
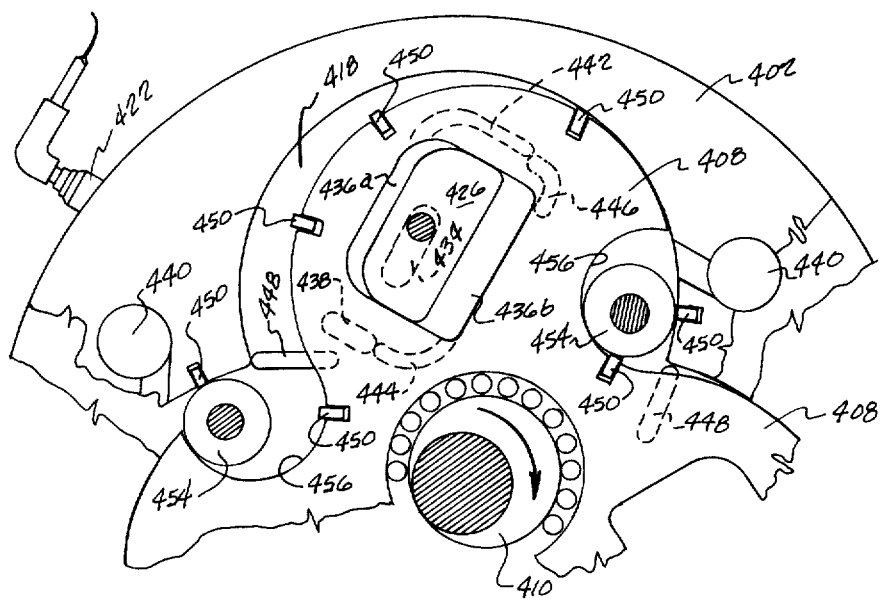
Figure 12D:
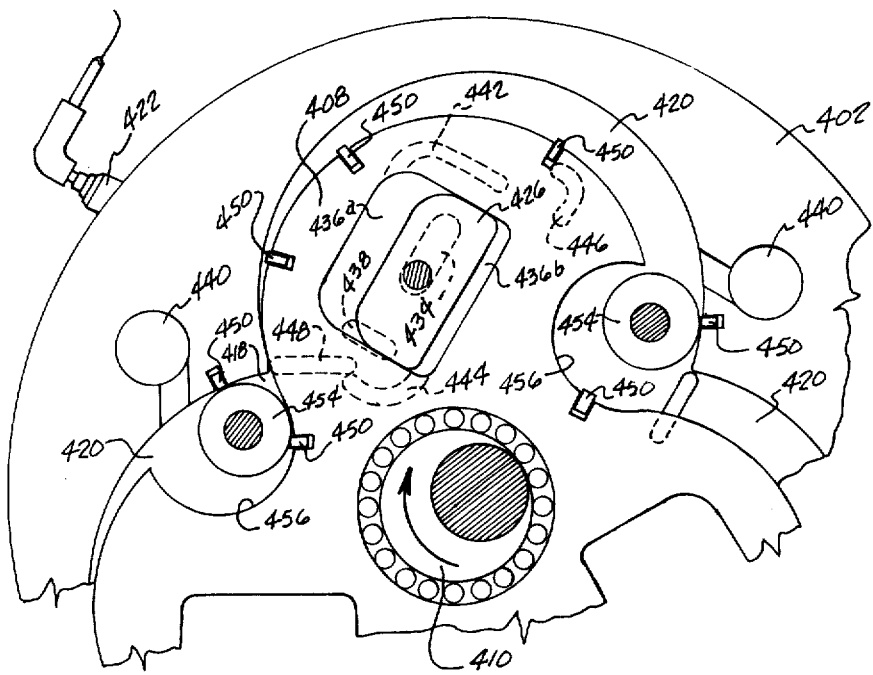
Figure 12C:
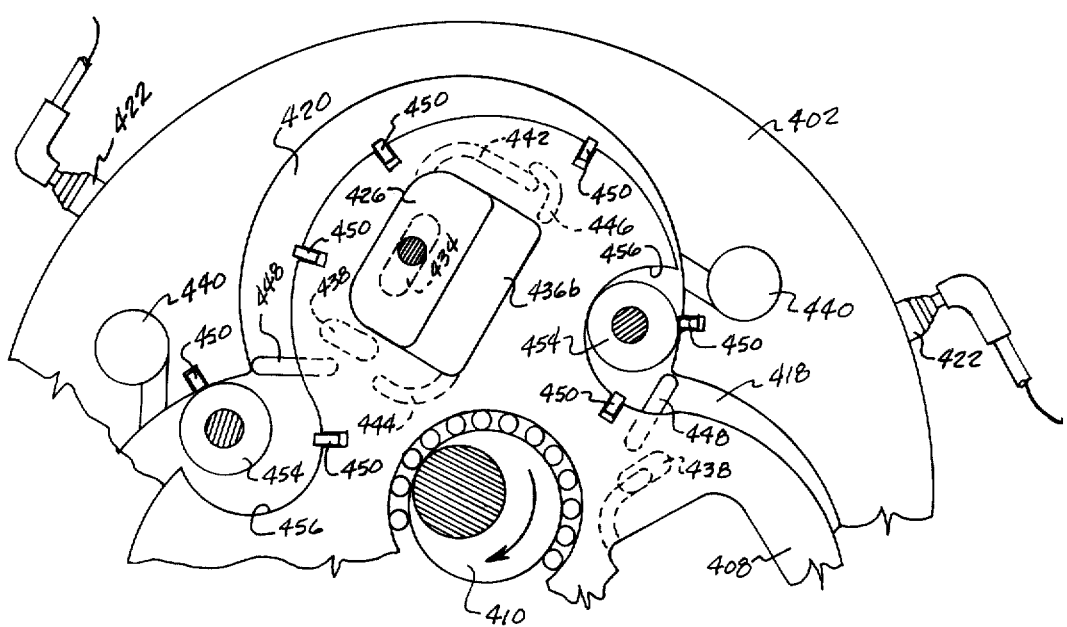
Figure 13:
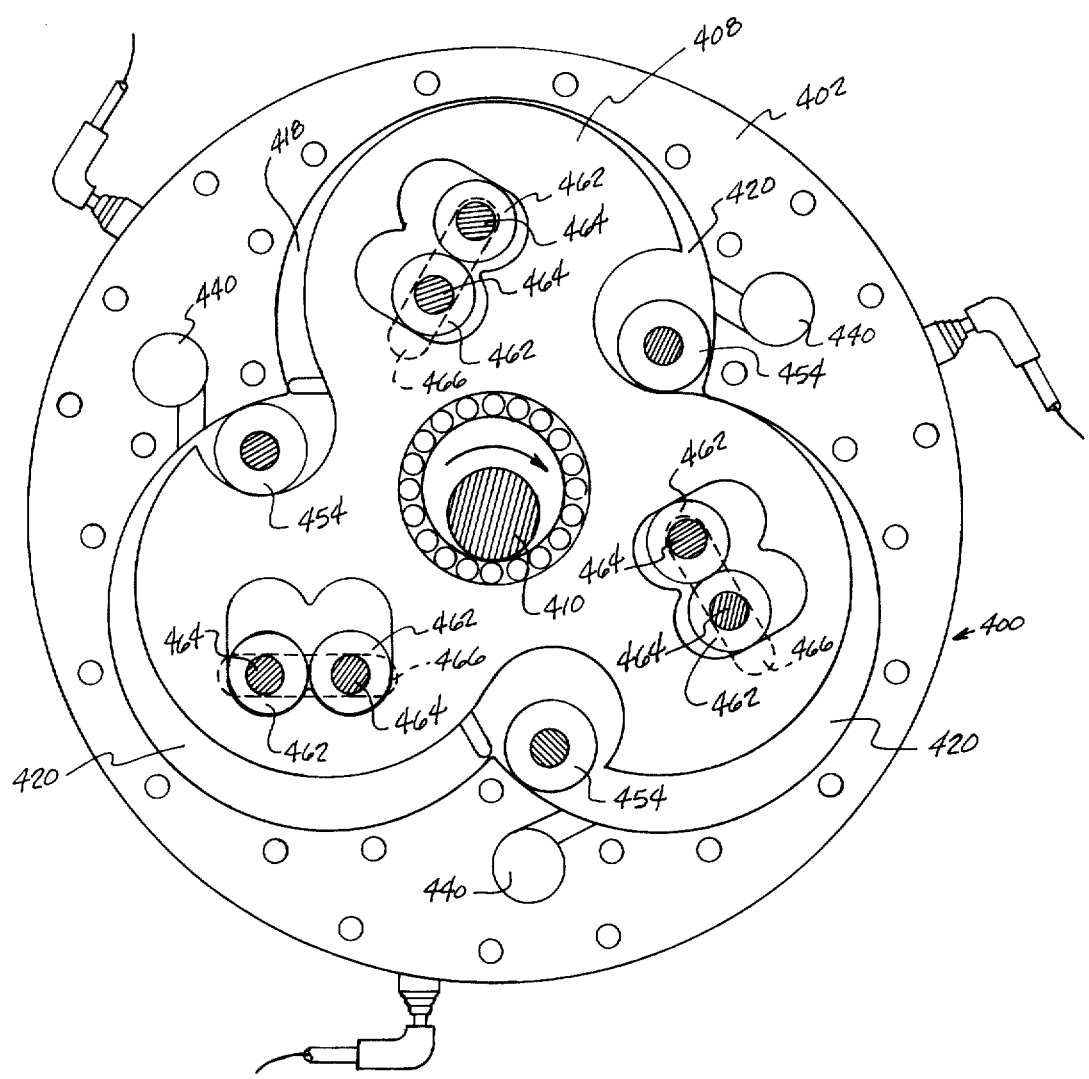
FIG. 13 is a schematic sectional elevation view of the engine embodiment of FIG. 8, but showing a modified form of movable wall member of the engine.

FIGS. 8-13 illustrate a further embodiment of the internal combustion engine of the present invention wherein the inner body recesses, or openings, with their movable wall members which form the intake and compression chambers of the engine are located radially inside the periphery of the inner body. FIG. 9 is a side elevation view of a three lobe engine 400, and FIG. 8 is a sectional elevation view of the engine taken generally along line VIII—VIII of FIG. 9, i.e., with a side wall of the engine housing removed. As seen, the engine housing is composed of a generally cylindrical peripheral wall 402, sides of which are enclosed by parallel spaced side walls 404, 406 to form an interior compartment having three peripheral lobes. Side walls 404, 406 are secured in fluid-tight relation to peripheral wall 402 of the engine housing by suitable means, such as a plurality of bolts, which are received through openings suitably spaced about the periphery of the engine. Note the bolt holes in the peripheral wall 403 as illustrated in FIGS. 8, 12a, and 13 of the drawings.

Disposed within the housing compartment is an inner body, or piston member, 408, having three corresponding peripheral lobes, each of which is located in a respective housing compartment peripheral lobe for movement therein during operation of the engine. A power output shaft 410 of the engine is suitably mounted for rotation about its longitudinal axis in housing side walls 404, 406, with an output portion of the shaft extending from side wall 406 of the housing (FIG. 9).

Inner body 408 is mounted on an eccentric portion 410a of the shaft which extends through a central opening of the inner body and a bearing assembly 412 provides for free rotation of the output shaft in the inner body opening.

As in the embodiments of the engine seen in FIGS. 1-7, inner body 408 is disposed in the housing compartment for non-rotational orbital movement about the rotational axis of output shaft 410. During orbital movement of the inner body, the spaced, parallel side walls 414, 416 (FIG. 10) of the inner body sealingly engage the inner surfaces of the side walls 404, 406 of the housing. Sealing means, such as pressure-biased seals 417 (FIG. 10), may be provided to facilitate such sealing engagement.

Formed between the peripheral wall of each inner body lobe and the opposed peripheral wall of each housing compartment lobe during a portion of inner body movement is a variable volume fluid combustion of power chamber, and a variable volume fluid exhaust chamber. In the position of orbital movement of the inner body seen in FIG. 8, a power chamber is shown at 418, while exhaust chambers are formed at 420. Each power chamber 418 which forms in each lobe during inner body movememnt is provided with fuel ignition means, such as a spark plug 422 (FIGS. 8-10), which is mounted in the peripheral wall 402 of the housing and communicates with an initial portion of the power chamber. Compression ignition (diesel), or other type ignition means, may be used instead of spark plug ignition, if desired.

Figure 10:
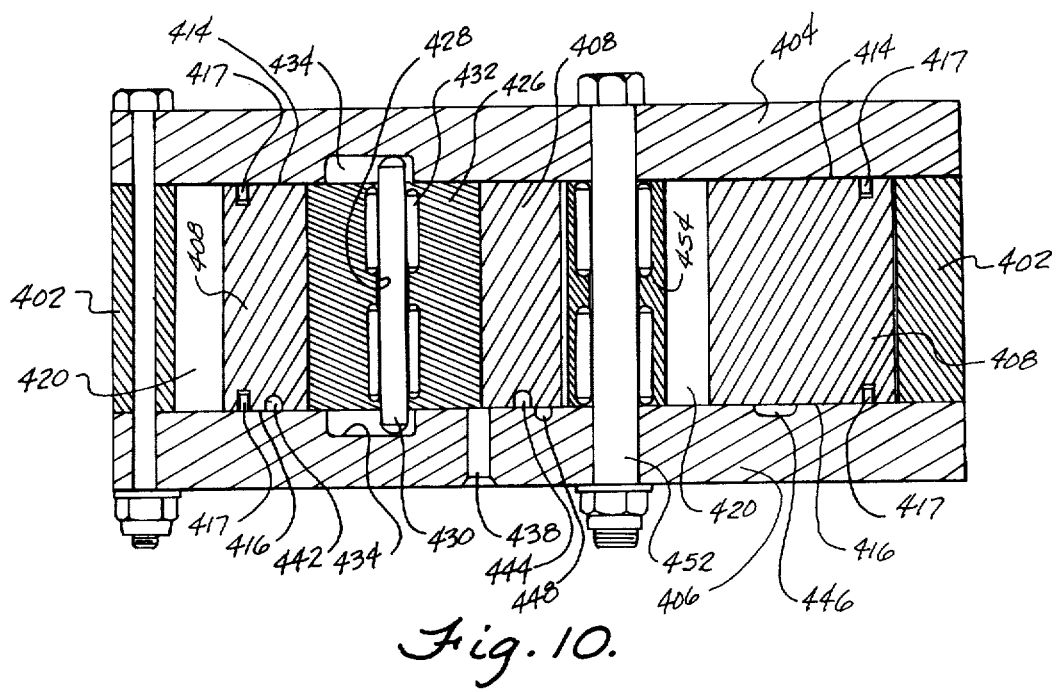
FIG. 10 is a sectional view of the engine embodiment of FIG. 8, taken generally along line X—X thereof, and looking in the direction of the arrows.

Located in each inner body lobe, radially inwardly of the periphery of the lobe, is a generally rectangular recess, or opening, 424 which extends through the inner body from side wall to side wall thereof. Positioned in each inner body recess 424 is a movable wall member 426 which is mounted for reciprocating movement on housing side walls 404, 406. As seen in FIG. 10, each movable wall member 426 has a central opening 428 which extends parallel to the axis of rotation of the drive shaft and a mounting pin 430 is rotatably received in the opening on bearings 432. Opposite end portions of the pin are supportably disposed for reciprocating movement in elongate guide slots 434 located in the side walls 404, 406 of the housing. Thus, as with the movable wall members of the engine embodiments of FIGS. 1-7, orbital movement of inner body 408 causes the movable wall member 426 in each inner body recess 424 to reciprocate along a rectilinear path defined by the housing side wall slots 434, which results in relative movement of the member in the inner body recess 424 toward and away from opposite side walls of the recess. The inner body 408 and housing side walls 404, 406 define a fluid intake and compression chamber in each inner body recess, and the movable wall member 426 sealingly separates first and second variable volume portions 436a, 436b thereof which are located in the recess on opposite sides of the wall member. Seals 435 are provided in end walls of movable member 426 to facilitate fluid-tight separation of the two portions, if desired.

Located adjacent each of the inner body recesses 424 in side wall 406 of the housing is a fluid intake port 438 of the engine, and fluid exhaust passage ports 440 provided in the peripheral wall 402 exit from a side wall 406 of the housing (FIG. 11) to exhaust combustion fluids from the exhaust chambers 420 of the compartment lobes, as will be explained.

As in the embodiments of the engine shown in FIGS. 1-7, the engine embodiment of FIGS. 8-13 is provided with passageway means for intercommunicating the fluid intake and compression chamber in each recess 424 with its adjacent intake port 438 and power chamber 418 during portions of 360° of orbital movement of the inner body about the axis of the output shaft 410. Since the construction and arrangement of these features are identical for each of the three lobes of the engine 400, their arrangement and sequence of intercommunication may best be described by reference to FIGS. 12a through 12d, which are views of a single lobe of the engine of FIG. 8 at sequential positions during inner body orbital movement through 360° of rotation of output shaft 410.

As seen in FIGS. 12a-12d, communicating with each inner body recess 424 and the intake and compression chamber portion 436a therein is an elongate curved groove 442 in the underside wall surface 416 (note FIG. 10) of the inner body. Also located in the underside wall surface of the inner body and communicating with each inner body recess and the chamber portion 436b therein at a point diagonally opposite groove 442 is a second elongate curved groove 444. Located adjacent the respective grooves 442 and 444 are grooves 446 and 448 in the contiguous inner wall surface of housing side wall 406 (note FIG. 10). As seen, housing side wall groove 448 extends into the power chamber 418 which forms in the housing lobe between inner body 408 and the housing.

The aforementioned grooves in the inner body side wall 416 and the housing side wall 406 sequentially intercommunicate to form respective passageways for intake of fluid, such as an air/gas mixture, through the intake port 438 into intake and compression chamber portions 436a, 436b, and for transfer of compressed fluid therebetween and into the power chamber 418 just prior to ignition and combustion, as will be described.

As shown in FIGS. 8 and 12a-12d, located at spaced locations in the peripheral wall of each inner body lobe and in the housing compartment lobe are suitable sealing means, such as spring-loaded, or otherwise outwardly biased, seal members 450, which facilitate sealing engagement of the inner body and the housing to separate the power and exhaust chambers during orbital movement of the inner body. The housing of the engine includes three roller seals 454 (FIG. 8), each of which is rotatably mounted on a support shaft or bolt 452 attached to the side walls 404, 406 (FIG. 10) of the housing adjacent an end of each housing lobe. During orbital movement of the inner body, the roller seal 454 is at all times in sealing engagement with a seal 450 in the peripheral wall of the housing compartment, and during approximately 180 degrees of orbital movement of the inner body, it also is in sealing engagement with the peripheral wall of a semi-circular recess 456 in the periphery of the inner body to separate the chambers in adjacent lobes of the housing. During engagement of each roller seal 454 with the peripheral wall of the inner body, it acts as an antirotation device to preclude any rotational movement of the inner body about the power output shaft 410.

The embodiment of the internal combustion engine shown in FIGS. 8-13 will be better understood from the following description of the operation of the engine, with particular reference to FIGS. 12a through 12d of the drawings. The three housing and inner body lobes are located at 120° intervals about the axis of rotation of the engine output shaft 410, and about the axis of eccentricity of the inner body, respectively. Each lobe individually performs a full four cycle operation of fluid intake, compression, power or combustion, and exhaust, with each lobe's four cycle operation being sequentially initiated at 120° intervals of orbital movement of the inner body. The power cycle of each lobe occurs through approximately 135° of orbital movement of the inner body, with overlap of the power cycle of each lobe with its next adjacent lobe in the firing sequence of the three lobes.

FIGS. 12a-12d illustrate sequential positions of an inner body lobe, its movable wall member, and the interconnecting passageway grooves at the beginning and at the end of each fluid transfer event between the chambers of the engine during each 360° orbital movement of the inner body. FIG. 12a shows the position of the inner body lobe at time of ignition of compressed fluid in power chamber 418 by spark plug 422. At that point, groove 444 has just ceased intercommunication with groove 448 to pass compressed fluid into the power chamber 418 from the compression chamber portion 436b in the inner body recess 424. Note that wall member 426 has completely collapsed the compression chamber portion 436b and that further clockwise orbit of the inner body will cause relative movement of wall member 426 toward the opposite side wall of recess 424 to compress the fluid in chamber portion 436a. Also note that further clockwise orbital movement of the inner body will also bring groove 444 into communication with fluid intake port 438 of the engine as chamber portion 436b begins to expand.

As shown in FIG. 12b, ignition and combustion of the combustible fluid in power chamber 418 causes expansion of the power chamber to impart clockwise orbital movement to the inner body and rotation to output shaft 410. The power chamber 418 is sealed at its opposite ends by contact of the inner body with roller seal 454 and contact of inner body seal 450 with the peripheral wall of the housing lobe. The inner body has advanced in clockwise orbital movement 120° from the position shown in FIG. 12a, with corresponding intake of fluid into expanding intake chamber portion 436b from port 438 via its communication with groove 444 and with corresponding compression of fluid in collapsing chamber portion 436a during such inner body movement. As shown in FIG. 12b, groove 444 has just ceased communication with intake port 438, groove 442 in the inner body is just before communication with groove 446 in the housing wall, and groove 446 is just before communication with chamber portion 436b to transfer compressed fluid from chamber portion 436a into chamber portion 436b.

FIG. 12c shows the position of the inner body at 180° of orbital movement from the position shown in FIG. 12a. In this position, movable wall member 426 has fully collapsed chamber portion 436a, chamber portion 436b fully expanded with compressed fluid, and innercommunication of grooves 442 and 446 with chamber 436b has ceased. Power chamber 418 has completed its expansion and power cycle, and the chamber unseals to become an exhaust chamber 420 and discharge fluid therefrom through the exhaust ports 440 at opposite ends of the chamber 420.

At the 300° position of the inner body and the direction of eccentricity of the output shaft 410 shown in FIG. 12d, wall member 426 has moved relatively in the inner body recess 424 to partially collapse compression chamber portion 436b and further compress fluid therein prior to its introduction into the power chamber of the lobe. Expanding intake and compression chamber portion 436a is in communication with intake port 438 to intake fluid, and groove 444 of the inner body is at a point just before communication with groove 448 to introduce compressed fluid from chamber portion 436b into the newly forming power chamber 418 of the housing lobe.

During further clockwise orbital movement of the inner body back to the position of the inner body shown in FIG. 12a, groove 444 communicates with groove 448 and groove 448 is in communication with power chamber 418 to transfer compressed fluid into the power chamber for ignition and combustion.

The foregoing described cycle of operation repeats during each 360° rotation of the power output shaft and 360° orbital movement of the inner body in the housing.

Thus, it can be seen that intake and compression of combustible fluid in the inner body recess 424 occurs by intake of fluid into both chamber portions 436a and 436b from intake port 448, and with transfer of compressed fluid from portion 436a into portion 436b prior to final introduction of compressed fluid into power chamber 418. By transfer of compressed fluid between the two chamber portions in the inner body recess, increased compression of the fluid, before its introduction into the power chamber, can be achieved with minimum space being required in the inner body for movement of wall member 426.

With the particular configuration and arrangement of the inner body 400 and the location of housing roller seals 454 in the embodiment of FIGS. 8-13, exhaust fluid can be discharged from the exhaust chambers of the engine simultaneously through two exhaust ports 440 during a portion of orbital movement of the inner body (note FIG. 8), thus facilitating exhaustion of the combusted fluid and improving efficiency and cooling of the engine during operation.

FIG. 11 of the drawings is a sectional view of the engine of FIG. 8 taken generally along line XI—XI thereof and indicates the position and location of fuel injection means, or a fuel injector 460, when it may be desired to introduce fuel directly into the compressed fluid in the power compartment, in lieu of carburetion and introduction of an air and fuel mixture through the fluid intake ports 438 of the engine.

FIG. 13 of the drawings illustrates a modified form of the three lobe internal combustion engine embodiment shown in FIGS. 8-12. The fluid transfer passageways and seals of the engine are omitted from the figure, but would be located as shown in FIGS. 8-12. As seen in the modification of FIG. 13, each of the movable wall members consists of a pair of rotatable roller seals 462 mounted on parallel axles or pins 464, the ends of which are mounted for reciprocation in slots 466 of the side walls of the housing, in the same manner as the mounting pin 430 of the movable wall members shown in FIGS. 8-12. The roller seals 462 of the movable wall member sealingly engage each other and side walls of their inner body recesses to separate the two intake and compression chamber portions of the recess, and the modification of the engine shown in FIG. 13 performs in the same manner as described in respect to that of FIGS. 8-12.

From the foregoing description of preferred embodiments of the invention, it can be seen that the four cycle internal combustion engine embodiments of the present invention carry out four cycle operation by use of only a single engine housing compartment with inner body member orbiting therein, and with multiple power cycles occurring in overlapping relation during orbital movement of the inner body to provide increased power output and efficiency of the engine.

Although the engine embodiment of FIGS. 8-13 has been shown and described as a single housing unit with single inner body or piston element, it can be appreciated that as with the embodiments of FIGS. 1-7, multiple housing compartments with inner bodies can be operatively connected to a single power output shaft, either by location of the units along the axis of the shaft, or by radial disposition of a plurality of such power units about a central output shaft, with suitable interconnection of the individual power outputs of the units to the central shaft by gearing arrangements. Although the engine housing is shown as composed of three wall sections, i.e., a peripheral wall closed by side walls, the housing compartment may be defined by two or more wall sections which sealingly engage to enclose the housing.

That which is claimed is:

1. An internal combustion engine comprising:
   (a) a housing defining an internal compartment having at least one peripheral lobe;
   (b) an inner body having at least one peripheral lobe thereon, means mounting said inner body in said compartment for non-rotational, orbital movement with said inner body lobe disposed for movement within said housing lobe during at least a portion of orbital movement;
   (c) an opening located in said inner body inwardly of the periphery thereof, a movable wall member disposed in said opening, and means mounting said movable wall member for movement in said opening;
   (d) portions of at least certain of movable wall member, inner body, and housing cooperatively defining a fluid intake and compression chamber, a variable-volume power chamber, and a variable-volume fluid exhaust chamber in said compartment during at least a portion of orbital movement of said inner body;
   (e) intake port means and exhaust port means in said housing communicating with said compartment;
   (f) passageway means comprising:
     (1) said intake and compression chamber with said intake port means;
     (2) said intake and compression chamber with said power chamber; and
     (3) said exhaust chamber with said exhaust port means
   during at least some portions or orbital movement of said inner body; and
   (g) a power output shaft, and means operatively connecting said inner body with said power output shaft to impart rotational movement thereto during orbital movement of said inner body.

2. An internal combustion engine as defined in claim 1 wherein said fluid intake and compression chamber is located in said inner body opening, said movable wall member is mounted on said housing for movement in said opening to define with said inner body and housing first and second portions of said intake and compression chamber and to expand and contract the same in response to orbital movement of said inner body; and said power and exhaust chambers are located in said compartment lobe.

3. An internal combustion engine as defined in claim 2 wherein said passageway means comprises passageways defined by said housing and inner body for communicating said intake port means with said first portion of said intake and compression chamber during its expansion and with said second portion of said intake and compression chamber during its expansion.

4. An internal combustion engine as defined in claim 3 wherein said passageway means further includes a passageway for communicating said first portion of said intake and compression chamber with said second portion thereof during contraction of said first portion and expansion of said second portion to transfer compressed fluid therebetween.

5. An internal combustion engine as defined in claim 4 wherein said passageway for intercommunicating said first and second portions of the intake and compression chamber comprises a groove in a wall portion of said inner body communicating with said opening, and a groove in a wall of said housing positioned for intercommunication with said inner body wall groove and said second portion of said intake and compression chamber during a portion of orbital movement of the inner body.

6. An internal combustion engine as defined in claim 3 wherein said first and second portions of said intake and compression chamber are located on opposite sides of said movable wall member in said inner body opening, and wherein said inner body and movable wall member move relatively during orbital movement of the inner body to expand one of said portions as the other of said portions contracts.

7. An internal combustion engine as defined in claim 6 wherein said passageway means includes a passageway intercommunicating said first and second portions of said intake and compression chamber during a portion of orbital movement of the inner body to transfer compressed fluid from one portion to the other, and a passageway for thereafter transferring compressed fluid from said other portion to said power chamber during a subsequent portion of orbital movement of the inner body.

8. An internal combustion engine as defined in claim 7 wherein said passageway intercommunicating said first and second portions of the intake and compression chamber comprises a first groove in a wall portion of said inner body communicating with said recess, and a first groove in a wall portion of said housing positioned for intercommunication with said first inner body groove and said second portion of the intake and combustion chamber during a portion of orbital movement of the inner body, and wherein said passageway for transferring compressed fluid from said second portion of the intake and compression chamber to the power chamber comprises a second groove in a wall portion of the inner body communicating with said inner body opening, and a second groove in a wall portion of said housing positioned for intercommunication with said second inner body groove and said power chamber during a portion of orbital movement of the inner body.

9. An internal combustion engine comprising:
(a) a housing defining an internal compartment having a plurality of peripheral lobes;
(b) an inner body having corresponding number of peripheral lobes thereon, means mounting said inner body in said compartment for non-rotational, orbital movement with each of said inner body lobes disposed for movement within a respective housing lobe during at least a portion of orbital movement of the inner body;
(c) a plurality of openings located in said inner body inwardly of the periphery thereof correspondingly in number to said inner body lobes, a movable wall member disposed in each opening, and means mounting said movable wall member for movement in its opening;
(d) portions of at least certain of said movable wall member, inner body, and housing cooperatively defining a fluid intake and compression chamber in each opening, and a variable volume power chamber and a variable volume fluid exhaust chamber in each housing lobe during at least a portion of orbital movement of said inner body;
(e) intake port means and exhaust port means in said housing communicating with said compartment;
(f) passageway means communicating
 (1) each intake and compression chamber with said intake port means,
 (2) each intake and compression chamber with a respective power chamber, and
 (3) each exhaust chamber with said exhaust port means
during at least some portions of orbital movement of said inner body; and
(g) a power output shaft, and means operatively connecting said inner body with said power output shaft to impart rotational movement thereto during orbital movement of said inner body.

10. An internal combustion engine as defined in claim 9 wherein each movable wall member is mounted on said housing for movement in its respective opening to define with said inner body and housing first and second portions of said intake and compression chamber and to expand and contract the same in response to orbital movement of said inner body.

11. An internal combustion engine as defined in claim 10 wherein each inner body opening and the fluid and intake compression chamber therein is located in a lobe portion of said inner body adjacent a respective power chamber in the adjacent compartment lobe thereto; said intake port means comprises an intake port located adjacent each inner body opening for communication with said intake and compression chamber therein; and said passageway means includes means defining a passageway for intercommunicating each said intake port with its adjacent intake and compression chamber during expansion of the same, and for communicating each intake and compression chamber with its adjacent power chamber to transfer compressed fluid thereto during a portion of orbital movement of the inner body.

12. An internal combustion engine as defined in claim 11 wherein said housing includes rotatable sealing means supportably attached to wall portions of said housing and located in said housing compartment between adjacent housing compartment lobes to sealingly engage said inner body during a portion of its orbital movement and thereby separate adjacent power and exhaust chambers of the engine.

13. An internal combustion engine as defined in claim 12 wherein the inner body includes a generally semi-circular recess in the peripheral wall portion thereof between each adjacent lobe of the inner body, and said rotatable sealing means engages the peripheral wall of the inner body in each inner body opening to sealingly separate adjacent power and exhaust chambers of the engine during portions of orbital movement of the inner body.

14. An internal combustion engine as defined in claim 13 wherein said inner body and housing further include sealing means located at locations along opposed wall surfaces thereof to facilitate separation of adjacent power and exhaust chambers of the engine during portions of orbital movement of the inner body.

15. An internal combustion engine as defined in claim 9 wherein said exhaust port means comprises an exhaust port communicating with each housing compartment lobe, and wherein each exhaust chamber of said engine is located in at least one compartment lobe to communicate with two of said exhaust ports and exhaust fluid from said engine during at least a portion of the orbital movement of the inner body in said housing compartment.

16. An internal combustion engine as defined in claim 9 including ignition means for combustible fluids communicating with said housing compartment and each power chamber therein to ignite combustible fluids in said power chamber during orbital movement of the inner body.

17. An internal combustion engine as defined in claim 9 wherein said movable wall member comprises rotatable roller means disposed in said recess and sealingly engaging each other and wall portions of said inner body opening to divide said intake and compression chamber therein into first and second variable volume portions.

* * * * *